United States Patent (10) Patent No.: US 10,161,451 B2
Capoldi et al. (45) Date of Patent: Dec. 25, 2018

(54) CAGE SEGMENT, SEGMENTED CAGE, AND BEARING

(71) Applicant: Aktiebolaget SKF, Gothenburg (SE)

(72) Inventors: Bruno Capoldi, Charentenay (FR); Vincent Bredoire, Pourrain (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/892,880

(22) Filed: Feb. 9, 2018

(65) Prior Publication Data

US 2018/0231057 A1 Aug. 16, 2018

(30) Foreign Application Priority Data

Feb. 15, 2017 (DE) .......................... 10 2017 202 449

(51) Int. Cl.
*F16C 33/51* (2006.01)
*F16C 33/50* (2006.01)
*F16C 19/24* (2006.01)

(52) U.S. Cl.
CPC ............ *F16C 33/502* (2013.01); *F16C 19/24* (2013.01)

(58) Field of Classification Search
CPC ........ F16C 19/30; F16C 19/305; F16C 19/51; F16C 19/513
See application file for complete search history.

(56) References Cited

U.S. PATENT DOCUMENTS

| | | | | |
|---|---|---|---|---|
| 3,501,212 A | * | 3/1970 | Husten | F16C 19/30 |
| | | | | 384/614 |
| 9,664,231 B2 | * | 5/2017 | Omoto | F16C 33/56 |
| 2010/0002973 A1 | * | 1/2010 | Omoto | F16C 33/513 |
| | | | | 384/548 |
| 2012/0282100 A1 | * | 11/2012 | Omoto | F16C 33/513 |
| | | | | 416/174 |

FOREIGN PATENT DOCUMENTS

EP 2610512 A1 * 7/2013 ............ F16C 19/386

* cited by examiner

*Primary Examiner* — Phillip A Johnson
(74) *Attorney, Agent, or Firm* — Bryan Peckjian; SKF USA Inc. Patent Dept.

(57) ABSTRACT

A cage segment for a bearing rotatable around an axis of symmetry that defines an axial direction and able to receive a plurality of rolling elements and having an inner and outer walls that extend circumferentially in the form of a of cylinder. A plurality of radial beams extend globally radially with respect to the axis and connecting the inner and outer walls. Each axial radial beam having a central portion and two end portions that are opposite with respect to the central portion. The central portion being symmetrical with respect to a plane of symmetry. The plane of symmetry of the at least one end portion cooperating with a rolling element to center the segment, forms with the plane of symmetry of the central portion an angle which is not equal to zero.

11 Claims, 7 Drawing Sheets

US 10,161,451 B2

CAGE SEGMENT, SEGMENTED CAGE, AND BEARING

CROSS-REFERENCE

This application claims priority to German patent application no. 102017202449.6 filed on Feb. 15, 2017, the contents of which are fully incorporated herein by reference.

TECHNOLOGICAL FIELD

The present invention relates to the field of bearings including rolling elements and spacing cages for maintaining these rolling elements. More particularly, the invention relates to a cage segment, to a segmented cage, and to a rolling bearing.

BACKGROUND

Particularly in the field of large-diameter bearings, for example large-diameter rolling bearings such as slewing bearings adapted to be used in wind turbines, tunnel boring machines, cranes, ladle turret, marine thrusters, stacker reclaimer, it is known to use segmented cages which comprise segments abutting circumferentially and having pockets for receiving the rolling elements. Each segment comprises a plurality of adjacent pockets, each pocket receiving one or several rolling elements.

Currently, such a segment with pockets receiving each several rolling elements is metallic and made from typically from brass. Such a segment with pockets receiving each only one rolling element is metallic (brass) or made from synthetic material.

Known segments are massive and heavy, in particular the ones made from metal.

Known segments can be obtained by different several manufacturing processes, including molding, injection molding, sand molding or machining.

Injection molding is the preferred manufacturing process for a segment made from synthetic material, but due to the large dimensions of the segment and its current geometry, it is not easy to inject synthetic material uniformly in the mold, and unfortunately sometimes bubbles of air are trapped in the segment, which degrades its mechanical properties. Also, still because of different geometrical thicknesses of portions of the segment, the shrinkage occurring during the cooling of the injected material is not uniform and lead to deformation of the segment or even sometimes its breakage.

Such a difference of thickness is present in a known segment illustrated on FIG. 1. The segment comprises an inner wall and an outer wall extending circumferentially (not represented) and radial beams 27 which connect together the inner and outer walls. Each radial beam comprises a central portion 27a and two opposite end portions 27b, 27c. At least one end portion 27b, 27c cooperates with one rolling element 9 to center the segment onto the rolling elements. The end portions are wider than the central portion, which indeed constitutes a difference of thickness, in the circumferential direction, of the radial beam.

The above situations induce scraps and untimely deteriorations and are not satisfying.

SUMMARY

According to one aspect of the invention, one embodiment, it is proposed a cage segment for a bearing rotatable around an axis X1 and able to receive a plurality of rolling elements meant to travel on two annular radial raceways of respectively an inner ring and an outer ring of the bearing.

The cage segment comprises an inner wall and an outer wall which both extend circumferentially in the form of a portion of cylinder, the axis of symmetry of which being X1.

The cage segment also comprises a plurality of radial beams which extend globally radially with respect to the axis and which connect the inner and outer walls.

Each radial beam comprises, in the axial direction, a central portion and two end portions which are opposite with respect to the central portion, at least one of the two end portions cooperating with a rolling element in order to center the segment onto the rolling elements.

The central portion and the end portions are each symmetrical with respect to a respective plane.

The plane of symmetry of the at least one end portion which cooperates with a rolling element to center the segment forms with the plane of symmetry of the central portion an angle which is not equal to zero.

According to further aspects of the invention which are advantageous but not compulsory, such a segment may incorporate one or several of the following features:

The central portion of the radial beam extends axially and at least one of the end portions of the radial beam extends axially and circumferentially;

Both end portions extend axially and circumferentially;

The planes of symmetry of the end portions form with the plane of symmetry of the central portion the same angle;

One end portion extends axially and the other end portion extends axially and circumferentially;

In a direction perpendicular to their respective plane of symmetry, the central portion and each end portion each have a constant thickness;

These thicknesses are identical;

The segment is made of a synthetic material and obtained by injection molding.

According to another aspect of the invention, a segmented cage for a bearing, comprises at least two successive segments according to the invention, each being able to receive at least one rolling element.

According to another aspect of the invention, a rolling bearing comprises a plurality of rings, rolling elements interposed between the rings and, for receiving the rolling elements, at least one of the cage segment or segmented cage according to the invention.

BRIEF DESCRIPTION OF THE DRAWINGS

The present invention and its advantages will be better understood by studying a bearing with a segmented cage, given by way of non-limiting example and illustrated by the appended drawings on which.

DETAILED DESCRIPTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description.

Figure 2:
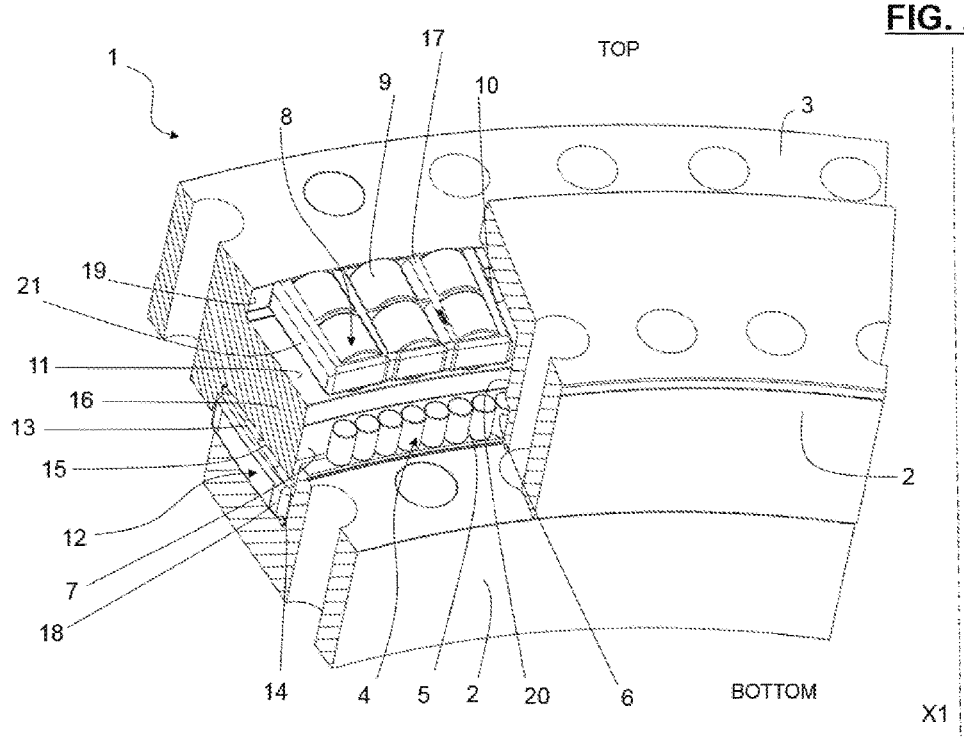
FIG. 2 is a perspective view in an axial cross-section of a bearing according to the invention and comprising two segmented cages, each segmented cage being according to the invention.

As illustrated on FIG. 2, a bearing 1 comprises an inner ring 2 and an outer ring 3 which are concentric and rotatable about an axis X1. The inner ring 2 is made of two parts. Axis X1 is disposed vertically, that is to say in a direction parallel to the gravity field, so as to define a top area TOP above the bearing, and a bottom area BOTTOM underneath the bearing.

The rings 2 and 3 are connected for example through several rows of rolling elements which will now be described.

For supporting radial loads, the bearing 1 comprises a row 4 of rolling elements 5 such as rollers, which are provided between raceways 6 and 7 of the rings 2 and 3 respectively. The raceways 6 and 7 are cylindrical. The raceways 6 and 7 are spaced apart radially. The raceway 6 belongs to the inner ring 2, and the raceway 7 belongs to the outer ring 3.

For supporting axial loads, from TOP to BOTTOM, the bearing 1 comprising a top row 8 of rolling elements 9 such as rollers, which are provided between two annular radial raceways 10 and 11 of the rings 2 and 3 respectively. The raceways 10 and 11 are planar and axially spaced apart with respect to the axis X1. The rolling elements 9 are meant to travel on the annular radial raceways 10, 11. The raceways 10, 11 extend in the radial direction with respect to axis X1.

For supporting axial loads, from BOTTOM to TOP, the bearing 1 comprising a bottom row 12 of rolling elements 13 such as rollers, which are provided between two annular radial raceways 14 and 15 of the rings 2 and 3 respectively/ The raceways 14 and 15 are planar and axially spaced apart with respect to the axis X1.

The outer ring 3 comprises a radially inner annular portion 16 comprising two axially spaced apart faces which extend radially and where the raceways 11 and 15 are arranged respectively. The radially inner annular portion 16 further comprises a inner face which extends axially and where the raceway 7 is arranged.

The rolling elements 9 of the row 8 are identical and maintained spaced apart by a cage 17.

The rolling elements 13 of the row 12 are identical and maintained spaced apart by a cage 18.

The cages 17 and 18 are centered on the central axis X1.

Figure 1:
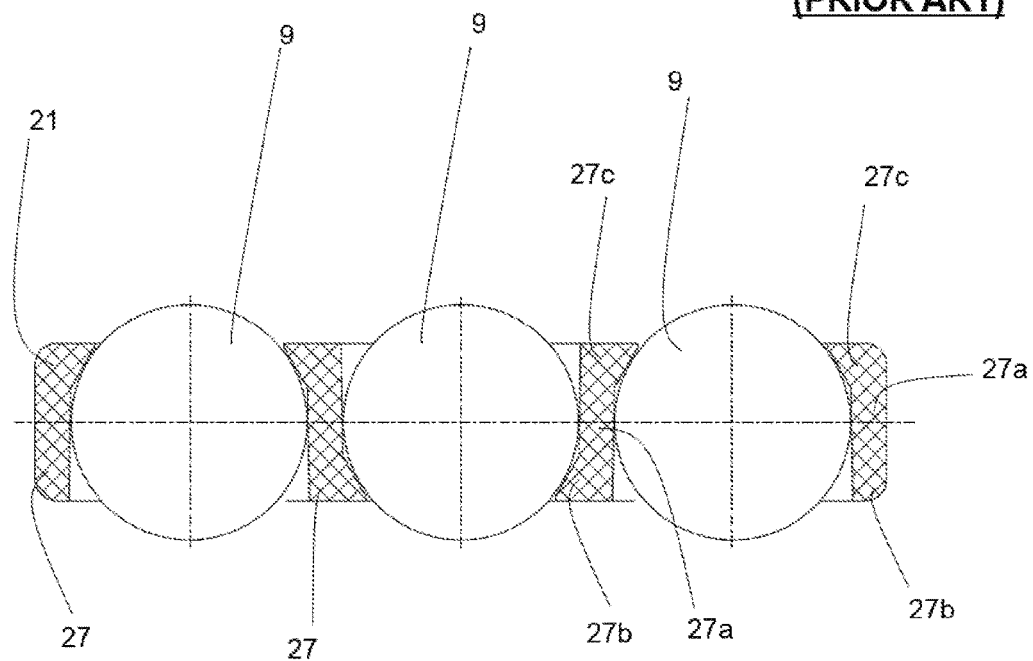
FIG. 1 is a view of a segment cage of the prior art.

In the illustrated embodiment of FIG. 1, the cages 17 and 18 are identical, and the rolling elements 9 and 13 are identical.

In what follows, one of these cages is going to be described in details.

The cage 17 is disposed between cylindrical surfaces 19 and 20 of respectively the outer ring 3 and the inner ring 2. The cylindrical surfaces 19 and 20 delimit radially the space in which the rolling elements 9 are travelling. The cylindrical surfaces 19 and 20 have the axis X1 as axis of symmetry.

The cage 17 is segmented and is constituted by a plurality of cage segments or segments 21. Advantageously, the segments 21 are adjacent and identical.

The cage 17 extends circumferentially over an angle equals to 360°.

Each segment 21 is made from synthetic material such as plastic such as PA66, or metallic material such as bronze alloy.

Each segment 21 is obtained from molding, for instance injection molding or sand molding.

In the illustrated embodiments of the invention, the segment is made from injection molding of a synthetic material.

Each segment 21 comprises an inner wall 22 which extends circumferentially in the form of a portion of cylinder. The axis of symmetry of this portion of cylinder is the axis X1.

Each segment 21 also comprises an outer wall 23 which also extends circumferentially and in the form of a portion of cylinder. The axis of symmetry of this portion of cylinder is also the axis X1.

The inner wall 22 comprises an inner cylindrical face 22A which faces the cylindrical surface 20 of the inner ring 2, and the outer wall 23 comprises an outer circumferential cylindrical face 23A which faces the cylindrical surface 19 of the outer ring 3.

Figure 3:
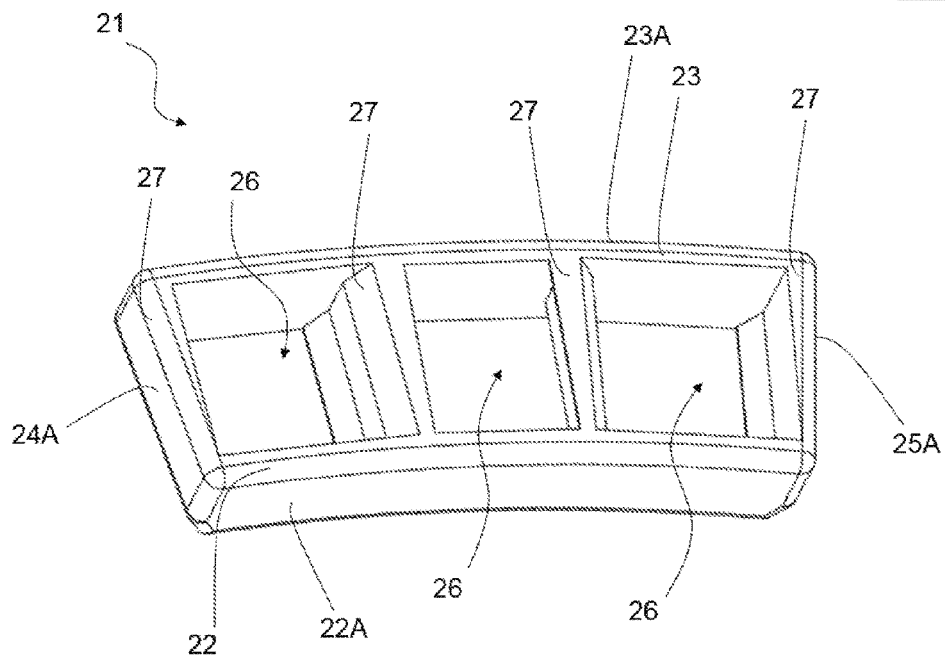
FIG. 3 is a perspective view of a first embodiment of a cage segment according to the invention.
Figure 4:
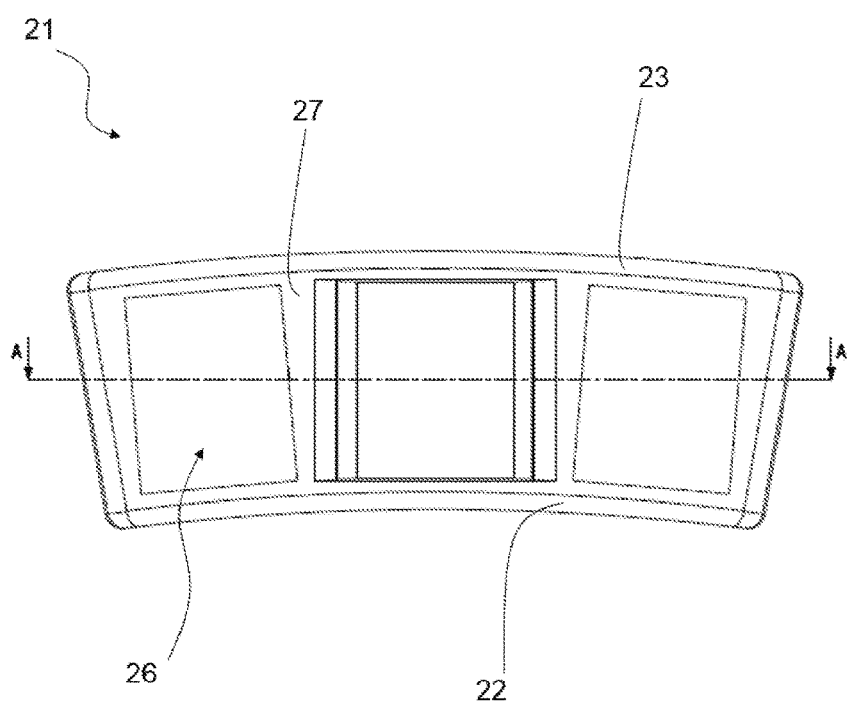
FIG. 4 is a top view of the cage segment of FIG. 3.

Each segment 21 is provided with axially transverse pockets 26 receiving respectively some or all the rolling elements 9 of the row 8. In the embodiment illustrated on FIGS. 3, 4 and 5, each pocket 26 receives one rolling element 9.

The pockets 26 are circumferentially delimitated by radial beams 27 which extend globally radially with respect to the axis X1.

The radial beams 27 connect the inner wall 22 and outer wall 23.

Figure 5:
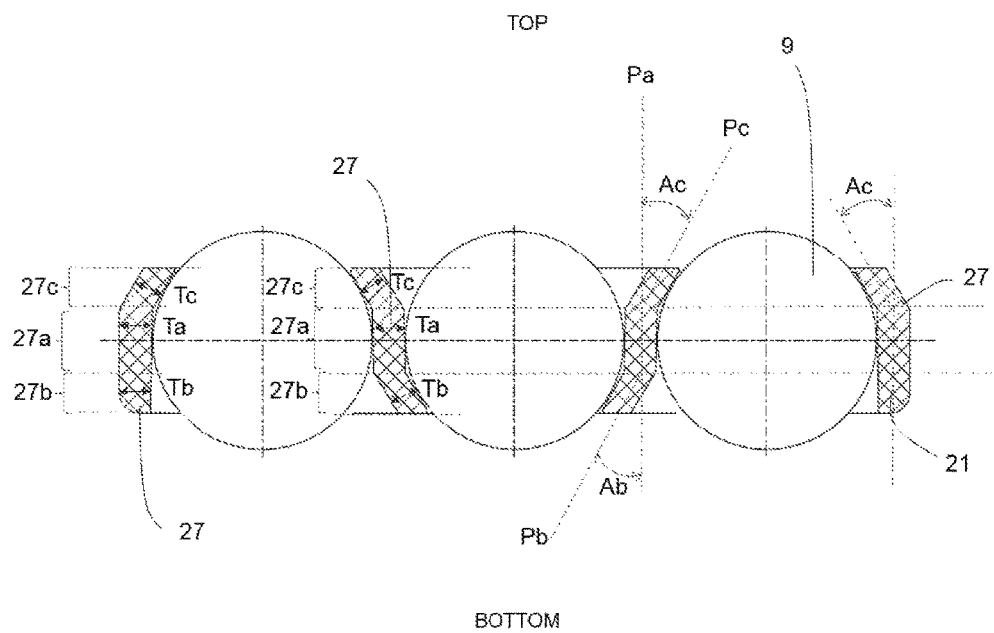
FIG. 5 is a cross section of the cage segment of FIG. 4 along A-A, equipped with rolling elements.

Referring now to FIG. 5, each radial beam 27 comprises in the axial direction, that is to say in the direction of the axis X1, a central portion 27a and two end portions 27b, 27c which are opposite with respect to the central portion 27a.

The central portion 27a is symmetrical with respect to a plane Pa, and each end portion 27b, 27c is symmetrical with respect to a plane Pb, Pc, respectively.

The plane Pb forms with the plane Pa an angle Ab, and the plane Pc forms with the plane Pa an angle Ac.

In the illustrated embodiment, as best visible on FIG. 5, the plane Pa extends radially and at least one of the planes Pb and Pc extends obliquely, that is to say both axially and circumferentially.

In the circumferential direction, each segment 21 has two opposite end radial beams 27. For each end radial beam 27, the central portion 27a and one of the two end portions 27b, 27c extends axially, and for any other radial beam 27 the central portion 27a extends axially and the two end portions 27b, 27c extend obliquely in such a way that the radial beam 27 is S-shaped in a axial cross-section. Still for any radial beam 27 other than the end radial beam 27, the planes of symmetry Pb and Pc of the end portions 27b, 27c are parallel, that is to say the angles Ab and Ac are equal.

Still referring to the embodiment visible on FIG. 5, for each of the two end radial beams 27 the angle Ab is equal to zero, whereas the angle Ac is not equal to zero, and for the other radial beams 27 none of the angles Ab and Ab is equal to zero.

The end portions 27b, 27c of the radial beams 27 which extend obliquely cooperate with the rolling elements 9 in order to center the segment 21 on the rolling elements 9, in such a way that in the assembled state of the bearing 1, that is to say when the segments 21 constituting the cage 17 are in place and adjacent circumferentially, the segment 21 stays away from the raceways 10 and 11 where the rolling elements 9 installed in the pockets 26 of the segment 21 travel. Without these oblique end portions, due to the gravity which acts from TOP to BOTTOM, there is a risk that the segment 21 tilts and come into contact with at least one of the raceways 10, 11, inducing additional friction, wear and wedging of the segment 21.

In a direction perpendicular to the plane Pa, the central portion 27a has a thickness Ta. In a direction perpendicular to the plane Pb, the corresponding end portion 27b has a thickness Tb. In a direction perpendicular to the plane Pc, the corresponding end portion 27c has a thickness Tc.

The thickness Ta of the central portion 27a is constant and the thickness Tb, Tc of each end portion 27b, 27c, respectively, is constant.

In the illustrated embodiment, the thicknesses Ta, Tb, Tc of the central portion 27a and the end portions 27b, 27c, respectively, are constant and identical, and can therefore been obtained easily and reliably by injection molding of synthetic material.

Also, each end radial beam 27 comprises respectively an end face 24A, 25A. When the bearing 1 is in the assembled state, that is to say when the segments 21 constituting the cage 17 are in place and adjacent circumferentially, each end face 24A, 25A of a segment 21 is abutting circumferentially the end face 24A, 25A of an adjacent segment 21.

Furthermore, the end faces 24A and 25A of each segment 21 are planar. Alternatively, the end faces 24A and 25A may have the shape of convex cylindrical shapes having axial axis parallel to the axis of the bearing 1 or the cage 17, or equivalent shapes, such that the end faces 24A and 25A of two successive adjacent segments are abutting only along an axial contact line, in order to minimize the friction within the cage 17.

Figure 6:
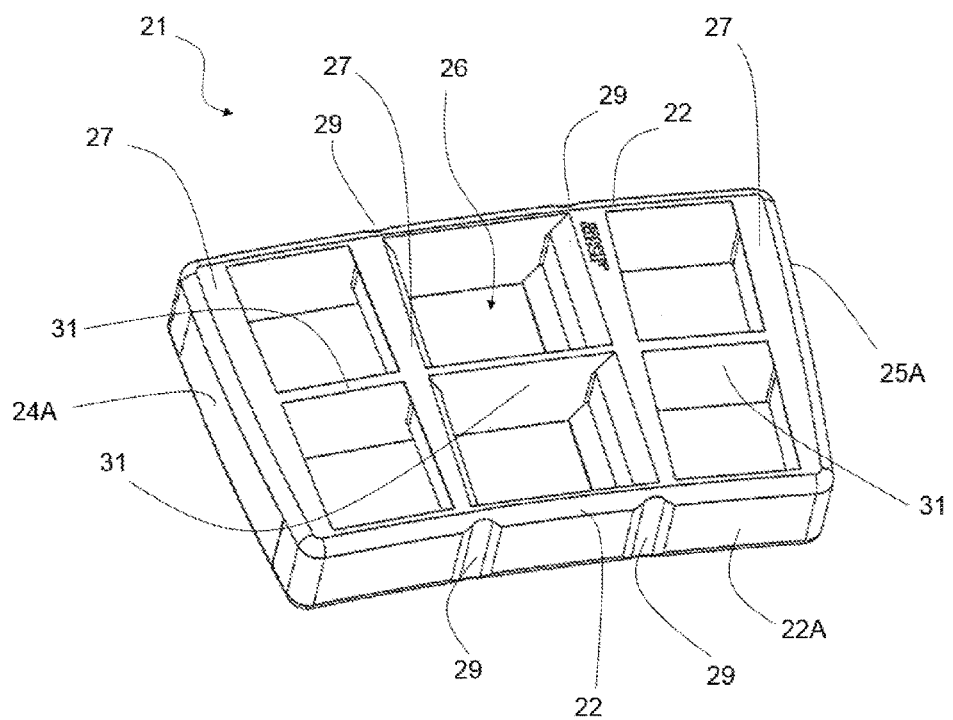
FIG. 6 is a perspective view of a second embodiment of a cage segment according to the invention.
Figure 7:
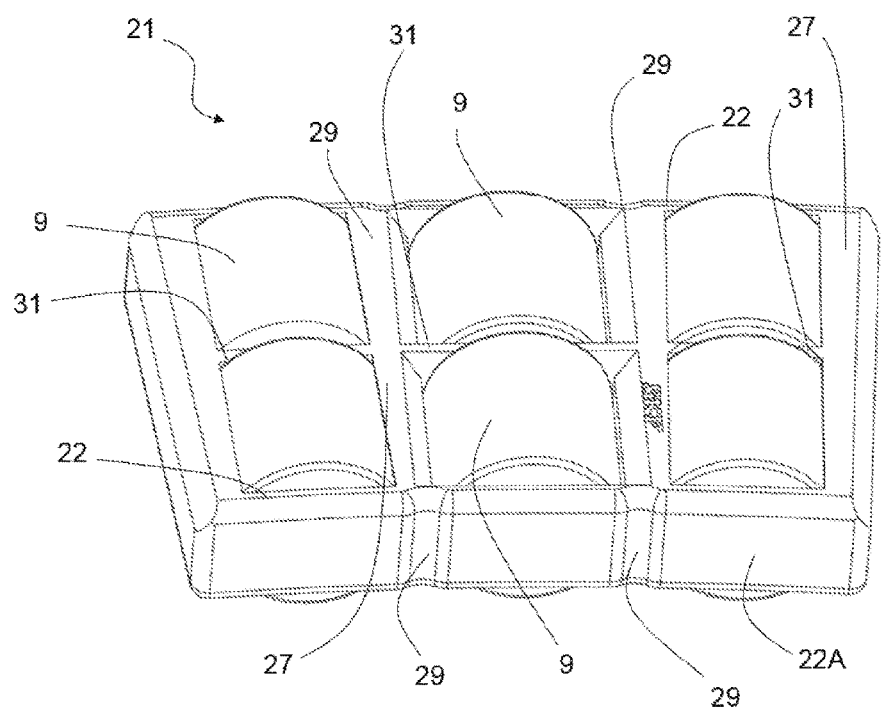
FIG. 7 is a perspective view of the cage segment of FIG. 6 equipped with rolling elements.

FIGS. 6 and 7 illustrate another embodiment of the invention where, for the sake of simplicity and clarity, the same elements as illustrated on FIGS. 1 to 5 bear the same numeral references.

Moreover, the inner wall 22 and the outer wall 23 of the segment 21 comprise a plurality of recesses 29. There is a recess 29 at the junction between the inner wall 22 and each radial beam 27, and there is a recess 29 at a junction between the outer wall 23 and each radial beam 27.

Recesses 29 are arranged on the inner face 22A of the inner wall 22 and on the outer face 23A of the outer wall 23, so as to face the cylindrical raceways 19 and 20 of respectively the outer ring 3 and the inner ring 2.

Each recess 29 is blind i.e. not made through a thickness of the segment 21.

Each recess 29 constitutes an additional reservoir for a lubricant to lubricate the contact between the rolling elements and their respective raceways. Also, thanks to the recesses 29, the segment 21 is lighter and there is no more or reduced plastic deformation of the segment during its shrinkage which is unavoidable when it cools down.

Furthermore, still for the embodiment illustrated on FIGS. 6 and 7, each pocket 26 is divided-up into two sub-pockets delimitated by a circumferential beam 31 so that each sub-pocket comprises a single rolling element 9. Each circumferential beam 31 is, in the circumferential direction, parallel to the inner wall 22 and the outer wall 23 of the segment 21.

Thanks to the circumferential beams 31, the segment 21 is more rigid.

Also, the circumferential beams 31 offer more injection points for the material to be injected, and therefore the injection process can be made more reliable and faster.

The present invention has been described regarding a segmented cage comprising a plurality of cage segments. The present invention can also be applied to a segmented cage comprising a single cage segment.

The present invention has been described regarding a segmented cage extending circumferentially over an angle equals 360°. The present invention can also be applied to a segmented cage extending circumferentially over an angle smaller than 360°.

The present invention has been described with a segment having a plurality of pockets or sub-pockets receiving each one rolling element. The present invention can also be applied to a cage having segments each receiving a plurality of pockets or sub-pockets with, in each pocket or sub-pocket, at least two rolling elements.

The present invention has been described with a segmented cage made of identical cage segments. The present invention can also be applied with segments constituting a segmented cage being different, for instance with segments with different number of pockets or different circumferential dimensions.

Also, the rolling elements maintained by the segments of the same row can be different, i.e. of different dimensions.

Thanks to the constant thickness of a radial beam according to the invention, the manufacturing of a segment obtained from molding a hot material is improved because:

The cooling time of the molded segment is reduced because there is less material to cool down and the surface in contact with the ambient atmosphere is larger, and There is no more or reduced plastic deformation of the segment during its shrinkage which is unavoidable when it cools down.

NOMENCLATURE

Ab, Ac angle
Ta, Tb, Tc thickness
Pa, Pb, Pc plane
X1 axis
1 bearing
2 inner ring
3 outer ring
4, 8, 12 row
5, 9, 13 rolling element
6, 7, 10, 11, 14, 15 raceway
16 annular portion
17, 18 cage
19, 20 cylindrical surface
21 cage segment or segment
22 inner wall
22A inner face
23 outer wall
23A outer face
24A, 25A end face
26 pocket
27 radial beam
27a central portion
27b, 27c end portions
29 recess
31 circumferential beam

What is claimed is:

1. A cage segment for a bearing rotatable around an axis that defines an axial direction, the cage segment able to receive a plurality of rolling elements configured to travel on two annular radial raceways and of respectively an inner ring and an outer ring of the bearing, and comprising:

an inner wall that extends circumferentially in the form of a portion of cylinder, the axis of symmetry of which being the axis (X1);

an outer wall that extends circumferentially in the form of a portion of cylinder, the axis of symmetry of which being the axis (X1);

a plurality of radial beams extending globally radially with respect to the axis (X1) and connecting the inner and outer walls, each radial beam comprising, axially, a central portion and two end portions, which are opposite with respect to the central portion, the central portion being symmetrical with respect to a plane (Pa), at least one of the two end portions cooperating with a rolling element in order to center the segment onto the rolling elements, wherein each end portion is symmetrical with respect to a plane (Pb, Pc), respectively, and the plane of symmetry (Pb, Pc) of the at least one end portion cooperating with a rolling element to center the segment in order to form with the plane of symmetry (Pa) of the central portion an angle (Ab, Ac) which is not equal to zero.

2. The cage segment according to claim 1, wherein the central portion of the radial beam extends axially and at least one of the end portions of the radial beam extends axially and circumferentially.

3. The cage segment according to claim 2, wherein both end portions extend axially and circumferentially.

4. The cage segment according to claim 3, wherein the planes of symmetry of the end portions form with the plane (Pa) of symmetry of the central portion the same angle (Ab, Ac).

5. The cage segment according to claim 2, wherein one end portion extends axially and the other end portion extends axially and circumferentially.

6. The cage segment according to claim 1, wherein a direction perpendicular to the plane (Pa), the central portion has a thickness, in a direction perpendicular to the plane (Pb), the corresponding end portion has a thickness (Tb), in a direction perpendicular to the plane (Pc), the corresponding end portion (27c) has a thickness (Tc), and in that the thicknesses (Ta), (Tb) and Tc) are constant.

7. The cage segment according to claim 6, wherein the thicknesses are identical.

8. The cage segment according to claim 1, further comprising being made of a synthetic material and obtained by injection molding.

9. A segmented cage for a bearing comprising:

a plurality of cage segments according to claim 1, wherein the cage segments are adjacent in a normal state of the assembled bearing.

10. A bearing comprising:

a plurality of rings, rolling elements interposed between the rings and, for receiving the rolling elements, at least one cage segment according to claim 9.

11. A bearing comprising:

a plurality of rings, rolling elements interposed between the rings and, for receiving the rolling elements, at least one cage segment according to claim 1.

* * * * *